United States Patent [19]
Louis

[11] 3,767,025
[45] Oct. 23, 1973

[54] INDEPENDENT TRANSFER MEANS FOR CONVEYOR SYSTEMS

[75] Inventor: Thomas C. Louis, Fort Worth, Tex.

[73] Assignee: N. L. Industries, Inc., New York, N.Y.

[22] Filed: May 18, 1972

[21] Appl. No.: 254,435

[52] U.S. Cl. ................................. 198/19, 104/209
[51] Int. Cl. ........................... B23g 5/22, B61b 7/20
[58] Field of Search ..................... 198/19; 104/202, 104/209, 211, 214; 269/55

[56] References Cited
UNITED STATES PATENTS
3,435,782  4/1969  Stewart .......................... 104/214 X
585,873  7/1897  Martin ............................ 104/209 X FOREIGN PATENTS OR APPLICATIONS
604,100  4/1960  Italy ................................ 104/211

Primary Examiner—Edward A. Sroka
Attorney—R. L. Lehman et al.

[57] ABSTRACT

Clutch mechanism comprising spaced parallel jaws adapted to selectively engage and release a moving cable, embodies toggle linkage connected to the clutch jaws in a manner such that the jaws are always maintained parallel to the cable in moving into and from engagement therewith; the clutch mechanism being one element of transfer means especially adapted for, but not limited to, use with conveyor systems of the type designed to move work piece supporting pallets to successive work stations.

13 Claims, 3 Drawing Figures

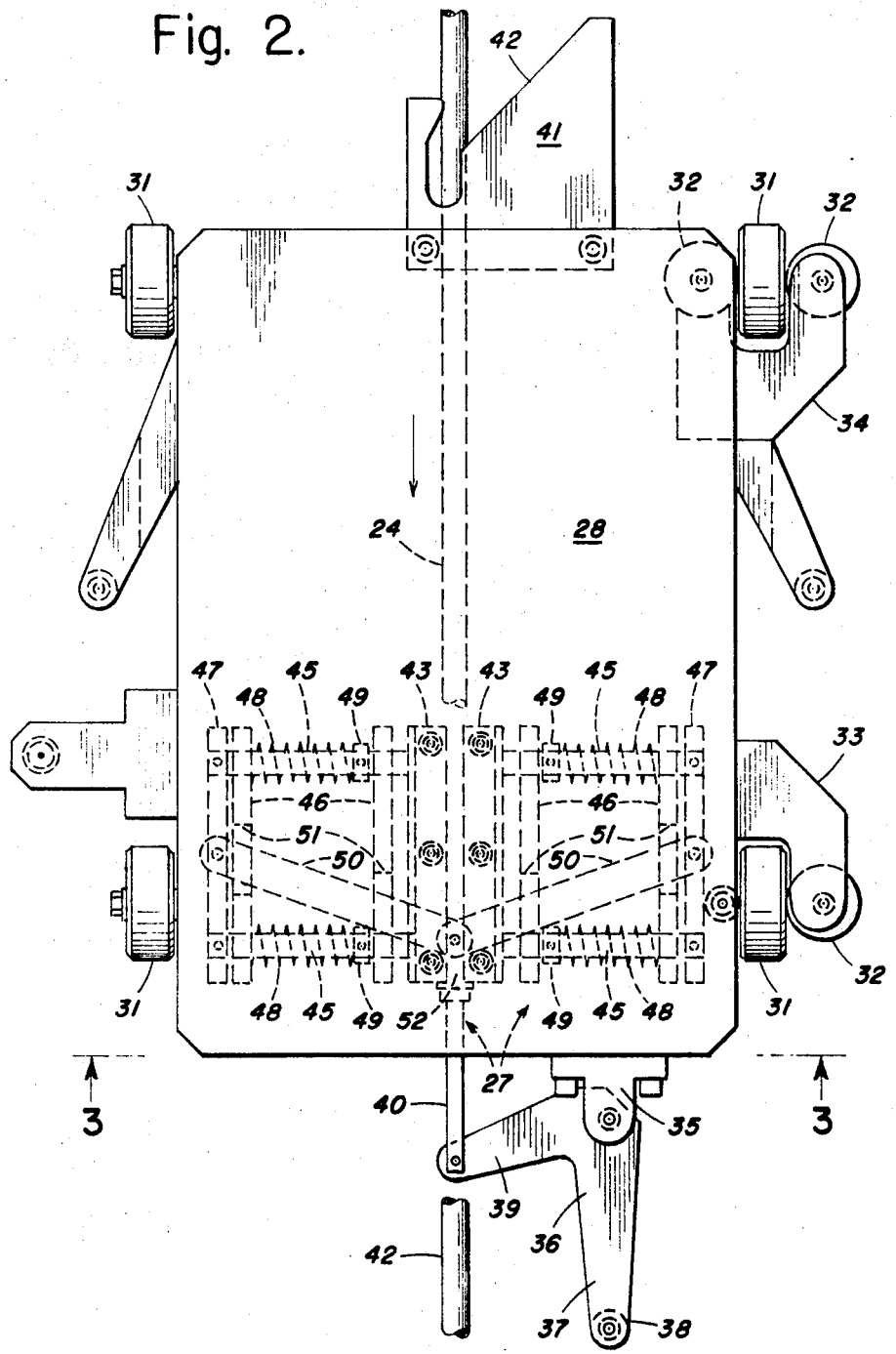

INDEPENDENT TRANSFER MEANS FOR CONVEYOR SYSTEMS

BACKGROUND OF THE INVENTION

Conveyor systems of the type commonly used to transport an article on which work is to be done, hereinafter referred to as a work piece, to successive work stations spaced along a conveyor track quite generally employ work piece supporting carriers or pallets, each of which is supported for independent movement along a conveyor track to successive work stations. The means used to transfer the pallets to the respective work stations is so designed that as a pallet enters a work station it is stopped and, in some cases, locked in precise location with respect to the work station, and remains in its stopped position until the work operation is completed, after which the pallet is released and moved on to the next work station. The stopping and starting of the pallets may be done manually or automatically, as the case may be; and is accomplished by transfer means which, in general, comprises a continuously moving endless conveyor belt, chain, or the like, and clutch mechanism carried by each pallet arranged normally to engage the endless conveyor belt or chain so that the pallet is carried along thereby, the clutch mechanism being actuated automatically or manually at each work station to disengage the continuously moving conveyor belt or chain. U. S. Pat. No. 3,088,197, Cargill, May 7, 1963, discloses a conveyor system of the type described wherein the pallet transfer means comprises an endless conveyor chain; and clutch mechanism in the form of a sprocket mounted on the underside of the pallet and adapted to engage the chain. The sprocket is normally locked against rotation and hence the pallet is moved forward by the endless chain until the pallet is released from the chain and comes to a stop. It should be pointed out also that the conveyor system of the aforesaid U. S. patent provides for a "float" of pallets between successive work stations by providing cam means on each pallet adapted to automatically unlock the sprocket of the next succeeding pallet for declutching the latter and hence preventing it from overtaking a preceeding stationary pallet.

When one considers that the conveyor system of this type may use conveyor tracks of from 50 to 100 feet long, it will be appreciated that the pallet transfer means, that is to say, endless chain and sprocket assembly of the prior art is relatively complex, expensive and unless properly lubricated, susceptible to frequent malfunction. It is therefore, an object of the present invention to provide improved clutch mechanism of the type designed to engage and disengage a moving cable and more particularly, a relatively simple, inexpensive pallet transfer means for conveyor systems of the type hereinabove described.

SUMMARY OF THE INVENTION

The instant invention relates in general to improvements in the pallet transfer means of conveyor system utilizing independent work piece holding pallets for transporting work pieces to successive work stations; and more particularly, to a transfer means comprising an endless cable having a uniformly smooth surface; and clutch mechanism characterized by a pair of spring loaded cable gripping jaws mounted on the underside of each pallet and actuated by toggle linkage for movement substantially parallel to said cable into and from engagement therewith. Firm engagement of the jaws with the smooth surface of the cable is effected by the force of compression springs which load the jaws, while disengagement of the jaws from the cable is effected positively in either of two ways, that is to say, by engagement of the toggle linkage with a cam supported on the frame of the conveyor track at an appropriate location with respect to a work station, or alternatively, by engagement of the toggle linkage with a cam projecting rearwardly from a preceeding pallet as hereinafter described.

The use of a relatively inexpensive cable and cable gripping jaws thus provides an important cost advantage over the more expensive sprocket and chain devices of the prior art and, in addition, greatly reduces the probability of malfunction. Moreover, by utilizing toggle linkage such that the cable jaws are always moved in parallel relationship to the cable the entire surface area of each jaw is upon closing the jaws engaged substantially immediately with the smooth surface of the cable thereby precluding drag and excessive wear on the cable.

DESCRIPTION OF THE DRAWINGS

FIG. 2 is an enlarged top plan view of one of the pallets used on the conveyor track of FIG. 1, showing, by dotted lines, the improved clutch mechanism mounted on the underside of the pallet.

DESCRIPTION OF THE PREFERRED EMBODIMENTS

The transfer means, that is to say, the clutch mechanism and smooth surfaced cable of the instant invention may be used in ways other than illustrated herein and such other uses are contemplated within the scope of the invention. However, its utility in conjunction with conveyor system of the type hereinabove described provides a preferred embodiment of the invention.

Figure 1:
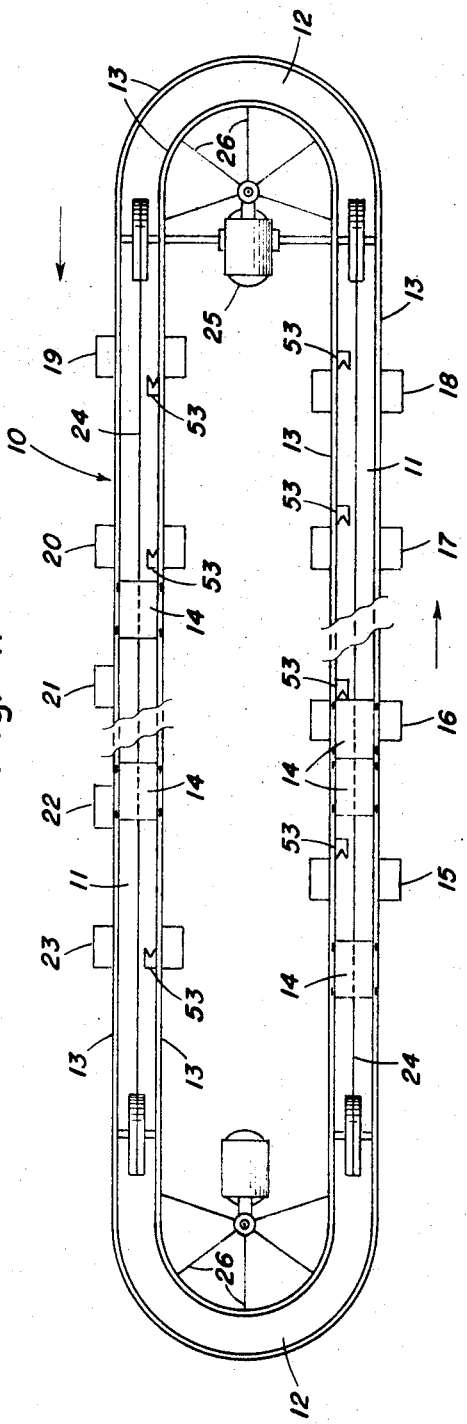
FIG. 1 is a schematic plan view of a conveyor system comprising a continuous conveyor track having a plurality of work stations located at spaced points along the track and a plurality of pallets adapted to be conveyed from station to station along the track.

Referring to FIG. 1, a conveyor system is shown comprising an endless conveyor track 10, disposed in a horizontal plane and having two spaced parallel straight runs 11—11 connected by semicircular end-runs 12—12. Both the straight runs and semicircular runs are characterized by spaced parallel rails 13—13. The several pallets are indicated by the numeral 14, each of which has wheels mounted on each side thereof adapted to ride on the conveyor rails 13—13 for movably supporting the pallets thereon. The several work stations for performing various operations on work pieces on the pallets are indicated generally by numerals 15 through 23 at which and may include both manual and automatic work stations various operations are performed on the work pieces, the specific kind of operation, that is to say, loading, pressing, drilling, reaming and the like depending on the overall nature of the manufacturing process. In this connection spacing of the work stations along the conveyor track may be and usually is nonuniform depending upon the specific nature of the operation performed some operations being of longer duration than others.

The individual pallets 14 are moved to the successive work stations by transfer means of this invention which comprises, in part, an endless conveyor cable 24 mounted between the spaced parallel rails of each straight run 11, and driven continuously by drive means indicated generally at 25. Each cable is distinguished by its relatively smooth surface and to this end may be fabricated of nylon or may be a nylon coated cable such as a manilla or wire rope coated with nylon.

By referring to FIG. 1, it will be seen that when a pallet arrives at the end of a straight run it is disengaged from its conveyor cable. It is then immediately engaged by suitable transfer means, in the form of horizontally mounted spider or the like, indicated generally at 26, which transfers the pallet from one straight run to the other where the pallet is picked up by the corresponding conveyor cable. The aforementioned transfer spiders are typical of those used in the industry and form no part of the present invention. For purposes of illustration and clarity movement of the pallets along the conveyor track is indicated as being in the direction of the arrow as shown in FIG. 1.

Figure 3:
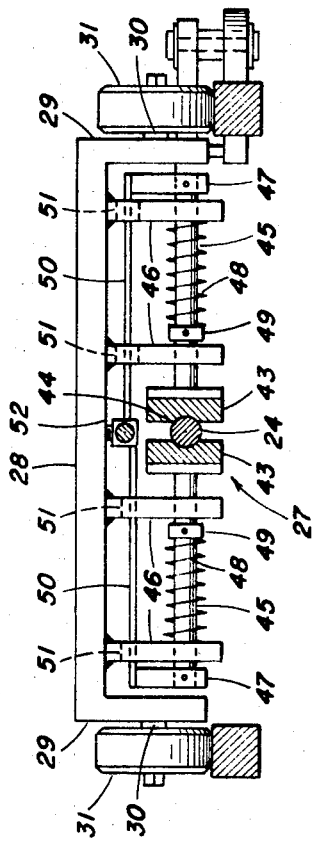
FIG. 3 is a front elevation of the pallet of FIG. 2 in the direction of arrows 3—3 in FIG. 2.

Referring again to the drawings, FIGS. 2 and 3 show details of one of the pallets employed in the conveyor system. Each clutch mechanism is indicated generally at 27 and is mounted on the underside of the pallet for engaging and disengaging the continuously moving cable 24, the clutch mechanism 27 being the other compoenent of the improved transfer means of this invention.

Each pallet comprises a substantially rectangular base plate 28, having depending side plates 29—29 mounting the stub axles 30 of pallet wheels 31 located fore and aft the base plate, the wheels 31 being suitably spaced to engage the conveyor rails 13. Each pallet 14 is also shown with guide wheels 32 supported by brackets 33 and 34, respectively, extending from one side of the base plate for engaging the corresponding rail 13 of the conveyor track.

Secured to the leading edge of the base plate of each pallet and adjacent its left hand edge is a bracket 35 on which a bell crank lever 36 is pivotally mounted to rotate in a substantially horizontal plane. The forwardly extending arm 37 of the bell crank lever carries a cam roller 38 on its underside as and for the purpose hereafter described, while the extremity of the short arm 39 of the bell crank lever is bifurcated and provided with a pin for pivotally connecting the forward end of connecting rod 40 thereto. The connecting rod 40 forms part of the toggle linkage hereinafter described.

As mentioned above, the conveyor system is of the type adapted to provide independent movement of the several pallets on the conveyor track; and also to compensate for different dwell times at different work stations by allowing successive pallets to overtake each other thus forming a "float." To this end a cam plate 41 extends rearwardly from the rear edge of each pallet and is formed with a cam slot 42 which is so positioned with respect to the forwardly extending arm of the bell crank lever of a following pallet that when the latter is moved into contact with a preceeding pallet the bell crank arm 37 of the following pallet and more particularly its cam roller 38 will engage in the cam slot 42 of the preceeding pallet and be automatically actuated to disengage the following pallet from the conveyor cable as and in the manner hereinafter described.

Normally the pallets of conveyor systems of the type described herein will have a work piece holding fixture bolted or otherwise secured on the base plate of the pallet. However, such work piece holding fixtures are irrevelant to the instant invention and, for the sake of clarity, are not shown in the drawings.

Turning now to the clutch mechanism indicated at 27 this is characterized by two cable gripping jaws 43—43 each of which comprises an elongated block adapted to be supported on the underside of the base plate of the pallet in spaced parallel relationship to the conveyor cable. Each jaw block 43 is provided with an elongated groove 44 facing the cable 24 each groove being substantially semicircular in cross section and of a diameter slightly less than the diameter of the cable such that when the jaw blocks 43 are moved together the cable will be gripped tightly therebetween substantially uniformly throughout the entire length of the grooves.

The jaw blocks are mounted on the underside of the pallet for movement into and from engagement with the cable 24 and to this end, each jaw block is supported by a pair of guide rods 45—45 the inner ends of which are welded or otherwise secured at the opposite ends, respectively, of the jaw blocks, the guide rods being substantially at right angles to the longitudinal axes of the jaw blocks and arranged to extend outwardly, that is to say, toward the outer edge of the pallet. Each pair of guide rods is, in turn, supported in substantially spaced parallel relationship and in a common horizontal plane parallel to the underside of the base plate by means of two guide blocks 46—46 fixed to the underside of the base plate, the guide blocks being arranged in substantially spaced parallel relationship and at substantially right angles to their respective guide rods 45—45 each guide block having apertures therein suitably spaced apart and dimensioned to accomodate the corresponding guide rod 45 the outer extremity of which extends beyond the corresponding outer guide block 46 and is pinned or otherwise secured to the corresponding end of a common yoke 47. Although each guide block 46 is shown as a separate member welded or otherwise secured to the underside of the pallet the invention also contemplates fabricating the four guide blocks as integral parts of a single casting secured to the underside of the pallet. The gripping force of the jaw blocks is provided, in the embodiment shown, by coil springs 48 supported on the guide rods 45. The outer ends of these springs abut against the inner faces of the corresponding outer fixed guide block while the inner ends of the springs abut against adjustable collars 49—49 keyed to the respective guide rods. The springs 48 normally under compression, the compression force of the springs being transferred by the collars 49 to the guide rods 45 to close the jaw blocks 43 on the cable with a tight nonslipping grip. The compression force of the springs may be varied by adjustment of the collars 49 on the respective guide rods.

Disengagement of the jaw blocks with the cable is effected by toggle linkage which includes links 50—50 mounted on the underside of the pallet in a plane above the jaw blocks and to this end the respective fixed guide blocks are provided with clearance slots 51 to accomodate the links 50. The inner end of each link 50 is pivotally connected to the inner end of a sleeve 52 the outer end of which is threadedly secured to the inner end of the aforesaid connecting rod 40. The outer ends of the links 50 are in turn pivotally connected to the respective yokes 47 intermediate the extremities thereof. Thus by moving the connecting rod 40, rearwardly the toggle linkage will force the jaw blocks apart against the compression force of the springs 48, thereby releasing the conveyor cable 24. It is noteworthy that in disengaging the cable the jaw blocks maintain their substantially parallel relationship to the cable and hence disengagement is simultaneously in toto, that is to say, the entire portion of the cable between the jaw blocks is released thereby preventing drag and development of friction.

The operation of the transfer means of this invention is believed to be obvious from the foregoing description. Suffice it to say, however, that when used in conjunction with a conveyor system employing work piece carriers or pallets, each pallet 14 is assembled on the conveyor track by first pressing back on the connecting rod 40 of the spring loaded toggle linkage to open the cable gripping jaws 43 which are thereafter released to engage the cable therebetween. The pallet is thereupon picked up and moved forward by the cable 24 on the conveyor track. Upon arriving at a work station the forwardly extending arm 37 of the bell crank lever is brought into engagement with a cam 53 (see FIG. 1) positioned, either manually or automatically, in the path of the bell crank lever arm 37 whereby the bell crank lever is moved clockwise thereby moving the connecting rod of the toggle linkage rearwardly and actuating the spring loaded toggle linkage to open the jaws and release the cable. The pallet is thus brought to a stop. Upon completion of the work operation the aforesaid cam is withdrawn, either manually or automatically, from the path of the bell crank lever arm thereby releasing the latter whereupon the spring loaded jaws re-engage the continually moving cable and the pallet is picked up and moved forward to the next work station. Should one pallet overtake another then the forwardly extending arm of the bell crank lever of the following pallet will engage the rearwardly projecting cam 41 of the leading pallet and be actuated thereby to declutch the following pallet from the continually moving cable thereby permitting the following pallet to come to a stop — succeeding pallets being similarly brought to a stop to form a "float."

The embodiment of the invention shown and described herein, is merely one typical application, and may be modified in numerous respects to meet specific requirements in other applications. In its broadest aspects however, the present invention is the concept of providing relatively simple inexpensive clutch mechanism for engaging and disengaging a continuously moving cable and in particular a cable having a uniformly smooth surface in a manner such as to provide positive gripping engagement, followed by immediate and complete disengagement such that wear on the cable is minimized. The specific embodiments of the invention as described above, are therefore to be considered in all respects as illustrative and not restrictive and all changes coming within the meaning and the equivalency range of the appended claims are intended to be embraced thereby.

I claim:

1. Clutch mechanism for selectively engaging and disengaging a continuously moving cable having a uniformly smooth surface said clutch mechanism comprising: a pair of clutch jaws, jaw mounting means arranged to support said jaws on opposite sides, respectively, of and substantially parallel to said cable for movement into and from engagement therewith, resilient means arranged normally to urge said movable jaws into gripping engagement with said cable, and jaw actuating means arranged to open said jaws against the restraining force of said resilient means to disengage said cable while maintaining the jaws substantially parallel thereto said jaw mounting means comprising at least one guide rod secured to each jaw at substantially right angles thereto, and fixed blocks constructed and arranged to slidably support each guide rod for movement in a direction substantially at right angles to said cable.

2. Clutch mechanism for selectively engaging and disengaging a continuously moving cable according to claim 1, wherein said resilient means comprises a coil spring assembled on each guide rod between said fixed blocks.

3. Clutch mechanism for selectively engaging and disengaging a continuously moving cable according to claim 2, wherein a collar is mounted on and adjustably secured to each guide rod between said fixed blocks, one end of each coil spring being arranged to abut its respective adjustable collar, the opposite end of each spring being arranged to abut the adjacent fixed guide block.

4. Clutch mechanism for selectively engaging and disengaging a continuously moving cable according to claim 1, wherein said jaw actuating means comprises toggle linkage connected to said jaws.

5. Clutch mechanism for selectively engaging and disengaging a continuously moving cable according to claim 1, wherein said jaw mounting means comprises a pair of guide rods secured to each jaw at substantially right angles thereto, and fixed blocks constructed and arranged to slidably support each pair of guide rods for movement in a direction substantially at right angles to said cable.

6. Clutch mechanism for selectively engaging and disengaging a continuously moving cable according to claim 5, wherein said resilient means comprises coil springs mounted on each guide rod between said fixed blocks, and said force adjusting means comprises an adjustable collar mounted on each guide rod one end of each coil spring being arranged to abut its respective adjustable collar, the opposite end of each spring being arranged to abut the adjacent fixed guide block.

7. Clutch mechanism for selectively engaging and disengaging a continuously moving cable according to claim 6, wherein said jaw actuating means comprises toggle linkage connected to said jaws and a bell crank lever constructed and arranged to actuate said toggle linkage.

8. In a conveyor system wherein work piece supporting pallets are moved to successive work stations, the improvement comprising a continuously moving conveyor cable having a uniformly smooth surface, clutch mechanism carried by each work piece supporting pallet, said clutch mechanism comprising a pair of clutch jaws constructed and arranged to selectively engage and disengage said continuously moving cable, jaw mounting means secured to the underside of said pallet and arranged to support said jaws on opposite sides, respectively, and substantially parallel to said cable for movement into and from engagement therewith, resilient means arranged normally to urge said movable jaws into gripping engagement with said cable, jaw actuating means arranged to open said jaws against the restraining force of said resilient means to disengage said cable while mounting the jaws substantially parallel thereto, said jaw mounting means comprising guide blocks fixed to the underside of said pellet and a pair of guide rods secured to each jaw at substantially right angles thereto and arranged to slidably engage in said guide blocks for movement in a direction substantially at right angles to said cable.

9. In a conveyor system wherein work piece supporting pallets are moved to successive work stations according to the improvement of claim 8 wherein said resilient means comprises coil springs mounted on each guide rod, and said jaw actuating means comprises toggle linkage connected to said jaws and a cam actuated bell crank lever carried by said pallet and arranged to actuate said toggle linkage.

10. In a conveyor system wherein work piece supporting pallets are moved to successive work stations according to the improvement of claim 9 wherein said cam is actuated and arranged independently of said pallet for movement into and from engagement by said bell crank lever.

11. In a conveyor system wherein work piece supporting pallets are moved to successive work stations according to the improvement of claim 9 wherein said cam is fixed to the rear edge of each pallet for engagement by the bell crank lever of a following pallet.

12. In a conveyor system wherein work piece supporting pallets are moved to successive work stations according to the improvement of claim 9, wherein said cable has a nylon surface.

13. In a conveyor system wherein work piece supporting pallets are moved to successive work stations according to the improvement of claim 9 wherein said cable comprises a nylon cable.

* * * * *